United States Patent [19]

Santi

[11] 4,150,629
[45] Apr. 24, 1979

[54] ORGANIZER

[76] Inventor: Arnold E. Santi, 8419 E. Baker St., Tucson, Ariz. 85701

[21] Appl. No.: 729,965

[22] Filed: Oct. 6, 1976

[51] Int. Cl.² ............................................ A47B 57/00
[52] U.S. Cl. ...................................... 108/60; 211/181; 229/42
[58] Field of Search ...................... 108/60; 211/10, 42, 211/41, 181; 220/8, 20, 21, 22; 229/27, 28 R, 15, 42; 133/3 B

[56] References Cited

U.S. PATENT DOCUMENTS

| | | | |
|---|---|---|---|
| 269,221 | 12/1882 | Mueller | 229/28 R |
| 411,430 | 9/1889 | Frye et al. | 229/42 |
| 464,723 | 12/1891 | Pope | 211/181 |
| 1,688,887 | 10/1928 | Spreen | 220/22 |
| 1,747,390 | 2/1930 | Robb | 220/22 |
| 2,692,044 | 10/1954 | Chappell | 133/3 B X |
| 3,009,625 | 11/1961 | Ackley et al. | 229/15 X |
| 3,176,849 | 4/1965 | Peebles | 211/181 X |
| 3,201,022 | 8/1965 | Glassco et al. | 229/42 X |
| 3,517,606 | 6/1970 | Myles et al. | 211/181 X |

FOREIGN PATENT DOCUMENTS 776734 6/1957 United Kingdom ...................... 211/74

Primary Examiner—Roy D. Frazier
Assistant Examiner—Peter A. Aschenbrenner
Attorney, Agent, or Firm—Cahill, Sutton & Thomas

[57] ABSTRACT

An organizer constructed of a length of bendable material having a plurality of vertical elements and a plurality of upper and lower horizontal elements stacks assorted items in readily accessible locations. Each of the vertical elements is connected intermediate alternate ones of the upper and lower horizontal elements and define alternately oriented pockets. A horizontal shelf panel supports the length of bendable material by providing contacting support for the plurality of lower horizontal elements. A first and second vertical shelf panel disposed at respective ends of the horizontal shelf panel laterally support the ends of the length of bendable material. A plurality of organizers can be stacked on top of each other to more fully utilize the available storage space between adjacent shelf panels in a shelf assembly, cabinet or cupboard.

4 Claims, 9 Drawing Figures

ORGANIZER

BACKGROUND OF THE INVENTION

1. Field of the Invention

This invention relates to organizers and, more particularly, to a wire mesh organizer folded into a serpentine-like shape and having ends supported by the vertical surfaces of a cupboard, cabinet or shelf.

2. Description of the Prior Art

In a modern day kitchen there are always a large number of bulky, shallow draft utensils which are difficult to store accessibly. Items such as frying pans, pot lids, cookie sheets, baking dishes and meat platters abound. Typically these items are stackably stored in shelves, cupboards or drawers. The items having larger diameters, such as large frying pans, are placed on the bottom of a shelf, while items of diminishing diameter are stacked on top of the lowest frying pan. Similarly, pie pans of decreasing diameter are stacked on top of one another. Usually it is very difficult to obtain access to any one selected item from a particular stack of kitchen utensils. To gain access to the selected piece of equipment, a stack of items must be laboriously disassembled and stored temporarily elsewhere. This procedure wastes time, frays nerves and often leads to breakage of fragile glassware.

Another area where an efficient organizer is needed is to assist in more completely utilizing the available storage capacity of shelf or cupboard. Frequently in a shelf assembly a great deal of vertical space between each of the individual shelf panels is wasted since the items which are stored upon the bottom of each panel do not extend fully to the lower edge of the next higher shelf panel. Because of this characteristic, articles are typically stacked on top of one another to fill in this unused shelf storage area. This technique more efficiently utilizes the total available shelf space, but makes access to the items on the bottom of the shelf far more difficult.

Even in the commercial establishments there is a substantial need for an organizer which allows for more efficient utilization of a limited amount of space to store office supplies of various sizes. Typically, an office storage cabinet has a uniform spacing between shelves. A great deal of the available space between shelves is unused since boxes of pencils, packs of paper, paper clips, rubber bands and various other types of supplies cannot be stacked very high without making access to those items on the bottom of each shelf impractically difficult.

Stores or other commercial enterprises that maintain a large inventory of different types of supplies, which must be periodically removed, replaced and inventoried, would also benefit from a more efficient means of organizing their supplies. A shoe store uses a large number of shelves having a fixed spacing between the panels. A number of shoe boxes are stored between shelf panels by vertically stacking them on top of each other. After a clerk has removed the lowest box in a stack it is quite difficult and awkward to replace that shoe box in its proper position unless each of the other boxes in that stack is first removed. Because time is very important in the retail shoe business, clerks frequently do not replace shoe boxes in the correct shelf locations if an entire stack of boxes must be removed to do so. Because of this difficulty, clerks frequently replace a shoe box out of position on the top of a stack. Subsequently locating a misplaced shoe box takes an excessive amount of time since a trial and error search is necessary.

As tentative solutions to the above enumerated problems, several organizers have been developed. U.S. Pat. Nos. 1,900,053, 3,203,557, 3,407,938 and 3,207,098 describe variously configured racks or display apparatus which are constructed using wire arranged in a serpentine-like manner. While these patents describe devices which attempt to solve various other types of storage problems, none of these meet the various domestic and commercial needs which have been described above.

SUMMARY OF THE INVENTION

In accord with one embodiment of the invention, an organizer is provided for storing assorted items in readily accessible locations. The organizer includes a length of bendable material which has a plurality of vertical elements and a plurality of upper and lower horizontal elements. Each of the plurality of vertical elements is connected intermediate alternate ones of the upper and lower horizontal elements to define alternately oriented pockets. A horizontal shelf panel supports the length of bendable material by providing contacting support for the plurality of lower horizontal elements. A first and a second vertical shelf panel located at respective ends of the horizontal shelf panel laterally supports the ends of the length of bendable material.

It is therefore a primary object of the present invention to provide an organizer which maximizes the utilization of the available space between the individual shelves of a cupboard or cabinet and vastly increases the accessibility of the items stored therein.

Another object of the present invention is to provide an organizer which will greatly increase the effective usable area of a shelf, cabinet or cupboard.

Yet another object of the present invention is to provide an organizer which receives its lateral support from the vertical sides of a shelf.

Still another object of the present invention is to provide an organizer which is fabricated of a wire mesh and folded into a serpentine-like configuration.

A further object of the present invention is to provide an organizer which can be vertically stacked between the individual panels of a shelf to form a plurality of storage pockets of either the same size or of a different size.

A still further object of the present invention is to provide an organizer which can be either collapsed or expanded in accordion fashion to fit between shelf assemblies of varying width.

These and other objects of the present invention will become apparent to those skilled in the art as the description thereof proceeds.

BRIEF DESCRIPTION OF THE DRAWINGS

The present invention will be described with specificity and clarity with reference to the following drawings, in which.

DESCRIPTION OF THE PREFERRRED EMBODIMENT

Figure 1:
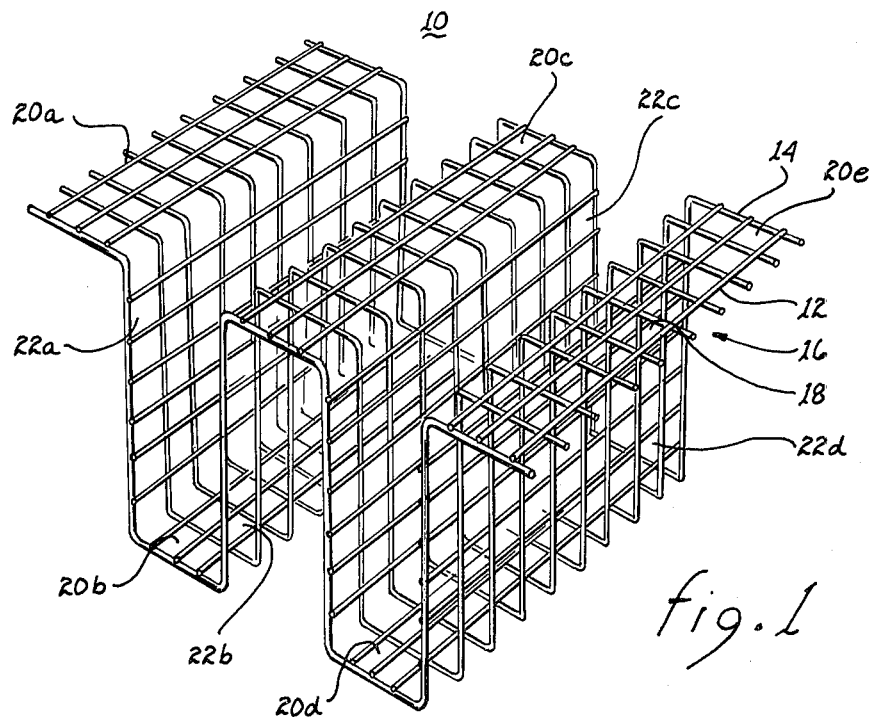
FIG. 1 is a perspective view of an organizer of the present invention.

FIG. 1 illustrates a single organizer 10. The organizer is typically constructed of wire, molded plastic or plastic coated wire mesh. A plurality of longitudinal elements 12 intersect a plurality of lateral elements 14 at right angles and are rigidly joined thereto. The strength and rigidity of organizer 10 is determined by the spacing of lateral elements 14 and longitudinal elements 12 and by the diameter of the wire or plastic members of which the organizer is formed.

Organizer 10 is formed into a serpentine-like configuration by bending the wire mesh at right angles to the longitudinal axis at predetermined intervals, thus forming horizontal elements 20a, b, c, d, and e, and vertical surfaces 22a, b, c, and d. In the preferred embodiment illustrated in FIG. 1 the width of horizontal surfaces 20 is substantially less than the height of vertical elements 22. This is a typical configuration of the organizer although any combination of height or width is possible. Organizer 10 is typically constructed in a uniform repetitive manner such that the width of each of horizontal elements 20 will be identical.

Figure 2:
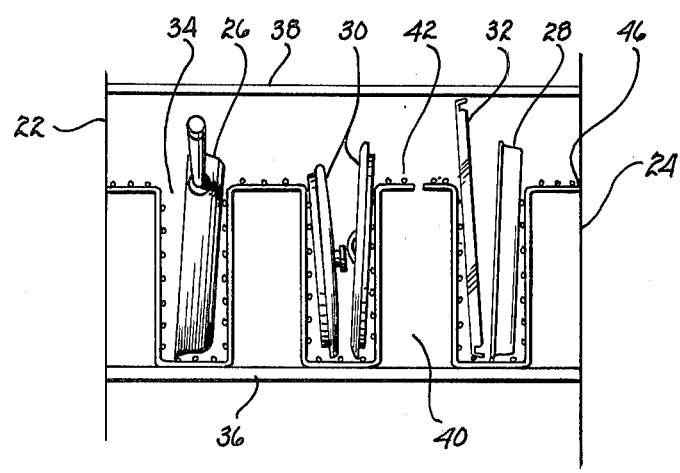
FIG. 2 shows the organizer installed between the side panels of a shelf assembly and used to store various kitchen utensils.

FIG. 2 shows an actual installation of organizer 10 between the left vertical shelf panel 22 and right vertical shelf panel 24. Organizer 10 is shown in a typical installation where it is used to store frying pan 20, baking dish 28, a plurality of pot lids 30, and cookie sheet 32. Each of these utensils is stacked vertically in either an inner pocket 40 or an outer pocket 34. The capability of an outer pocket such as 34 to support an item is limited only by the distance between lower shelf panel 36 and upper shelf panel 38. The upper limit on the vertical dimension of an item to be stored within an inner pocket, such as inner pocket 40, is determined by the distance between the bottom of lower shelf panel 36 and the upper surface 42 of pocket 40.

The total width of organizer 10 is typically slightly greater than the spacing between side panels 22 and 24. During installation, organizer 10 is slightly compressed so that once in position left edge 44 presses against side panel 22 and right edge 46 presses against side panel 24. This feature provides lateral support and a friction fit which maintains organizer 10 in position on shelf 36 when items are either inserted into or withdrawn from the organizer. Any lateral force exerted upon any vertical element of the organizer is transmitted to these two side panels 22 and 24 by the two ends 44 and 46.

Figure 3:
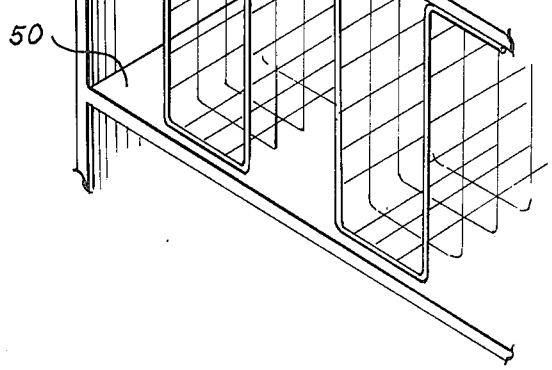
FIG. 3 is a perspective view of an organizer of the present invention which fits exactly within the space between an upper and a lower cabinet shelf.

FIG. 3 shows a somewhat different installation from FIG. 2 in that the height of organizer 10 is exactly equal to the spacing between shelves 48 and 50. In this particular installation the storage capacity of the inner pockets is equal to the storage capacity of the outer pockets.

Figure 4:
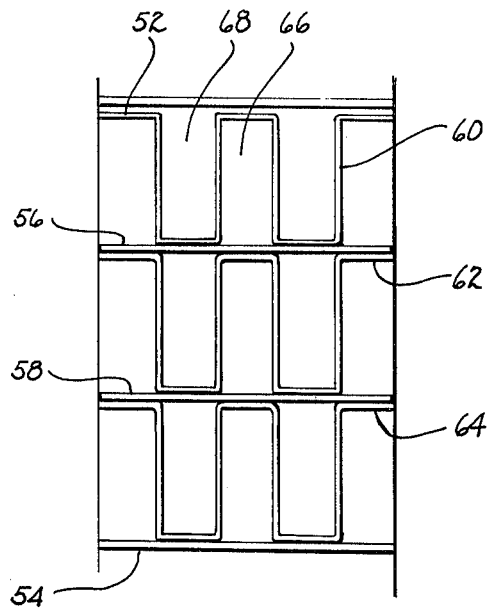
FIG. 4 illustrates an organizer of the present invention in which three individual organizer elements are stacked on top of each other to completely fill the space between an upper and a lower panel of a shelf assembly.

FIG. 4 illustrates a stacked embodiment of the organizer which might be used in a shoe store or automotive parts store to provide individual pockets for the stacking of various shoe boxes or automotive parts vertically between shelf panels 52 and 54. Spacer panels 56 and 58 are inserted between organizers 60, 62, and 64 to maintain each of the three organizers in position and to more evenly distribute the load from one organizer to those organizer elements below it. The dimensions of spacer panels 56 and 58 should be the same as that of shelf panels 52 and 54. Spacing panels 56 and 58 are typically fabricated of a stiff cardboard, plastic, or wooden material which is both lightweight and quite inexpensive.

Since organizers 60, 62, and 64 are of uniform dimension the storage space within an inner pocket 66 or an outer pocket 68 will be the same for each of the 15 pockets between shelf panels 52 and 54. Thus, a plurality of shoe boxes can be individually stored in or removed from each of the pockets shown in FIG. 4. For inventory purposes a designated pocket can be labeled with the size designation and manufacturer of a particular shoe which is to be stored in that particular pocket. Then if that shoe is missing during an inventory one can readily identify it.

Figure 5:
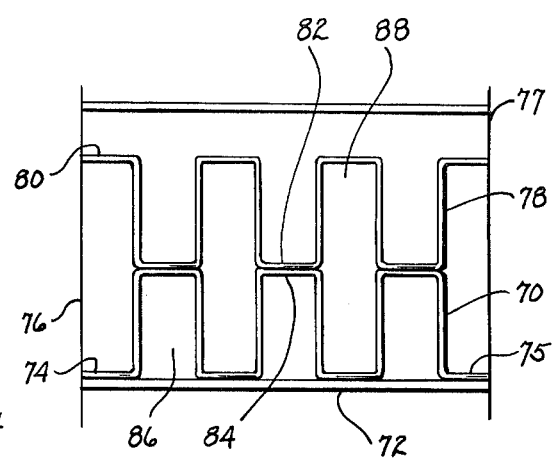
FIG. 5 illustrates another embodiment of the present invention in which storage pockets of three different sizes are provided by installing a first and a second organizer with opposite orientations.

FIG. 5 shows an alternative embodiment of an organizer system in which organizer 70 is positioned on shelf panel 72 with its outer ends 74 and 75 resting against both panel 72 and panels 76 and 77. Organizer 78 is then positioned above organizer 70 with a complimentary symmetry where end 80 is positioned in a manner opposite that of end 74 so that one-half of the horizontal elements, such as element 82, rest on and are supported by an opposing horizontal element such as element 84 of lower organizer 70. In this manner, the two organizers 70 and 78 can be stacked on top of each other and a spacer panel is not required.

In this particular configuration a variety of pocket sizes are available. Pocket 86 has a relatively small capacity while pocket 88 has a vertical dimension twice that of pocket 86.

Figure 6:
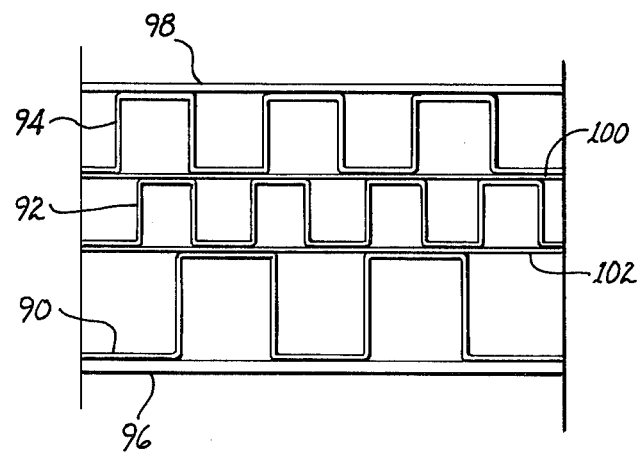
FIG. 6 illustrates another embodiment of the present invention in which organizers of three different sizes are installed vertically between an upper and a lower panel in a shelf assembly.

FIG. 6 illustrates another possible arrangement of an organizer system which might be used to store office supplies. Organizers 90, 92, and 94 are installed between shelf panels 96 and 98 and the spacing therebetween is maintained by spacer panels 100 and 102.

The size of the pockets in organizer 90 are quite large so that large, relatively heavy items such as stacks of paper and boxes of notebook pads might be located adjacent to shelf panel 96. This particular location is preferred since the heavier items are not directly supported by the organizer 90 itself, but rest on and are directly supported by lower shelf element 96. The size of the pockets in organizer 92 are relatively small and items such as pencils, pens, paper clips, typewriter ribbons, etc. can be stored here.

Organizer 94 is located above organizer 90 and contains somewhat larger pockets than those in organizer 92. In this manner, intermediate size items can be stored in organizer 94 and office personnel can selectively remove any stored item from any pocket in any of organizers 90, 92, or 94 without disturbing the contents of any other organizer pocket.

Figure 7:
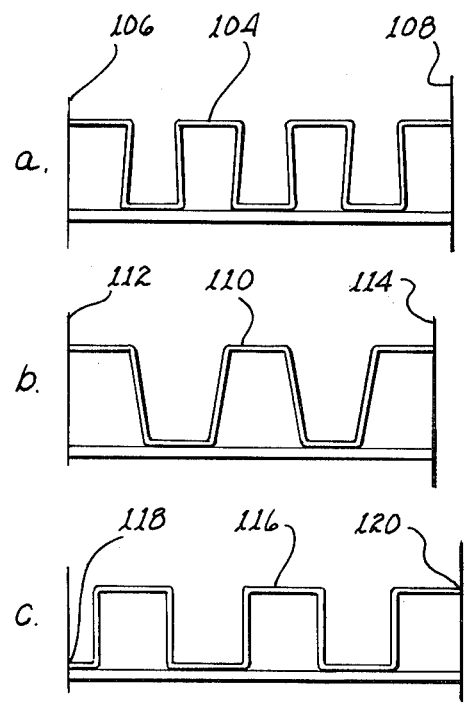
FIGS. 7(a), 7(b), and 7(c) illustrate three different configurations to adapt an organizer to fit within a shelf of a predetermined width.

FIG. 7 illustrates a variety of ways in which an organizer can be adjusted to fit between vertical panels of variable spacing. FIG. 7(a) illustrates an organizer 104 which is somewhat wider than the space between vertical panels 106 and 108. Organizer 104 can be laterally compressed to fit between these two vertical panels and will still function properly even though its vertical elements will be somewhat angled with respect to the vertical plane.

FIG. 7(b) illustrates an organizer 110 which was not of sufficient width to fit between vertical panels 112 and 114. To obtain a proper fit in this particular situation the width of organizer 110 is slightly expanded by bending it so that it fits properly upon this shelf assembly.

FIG. 7(c) shows a third way in which an organizer can be accommodated within a pair of vertical elements. Here organizer 116 was reduced in length by cutting a selected amount of material from ends 118 and 120. Normally a sufficient length of material would be cut from a single end of organizer 116 to allow it to fit between the two vertical panels, although it is possible to cut a predetermined amount from each end 118 and 120 in order to provide end pockets of different width as was done in this case.

While the princples of the invention have now been made clear in several illustrative embodiments, there will be immediately obvious to those skilled in the art many modifications of structure, arrangement, proportions, elements, materials, and components, used in the practice of the invention which are particularly adapted for specific environments and operating requirements without departing from those principles.

What is claimed is:

1. A non free standing organizer for storing horizontally insertable assorted household items, namely kitchen utensils, in horizontally accessible compartments, said organizer being insertable within a horizontally accessible unit having a horizontal shelf panel, portions of which directly support the stored items and portions of which support said organizer and further having first and second vertical shelf panels extending upwardly from the horizontal shelf panel for limiting the longitudinal extension of said organizer and thereby providing lateral support for said organizer, said organizer comprising in combination: a continuous length of bendable wire mesh material folded into a repetitive pattern of an upper horizontally oriented element, a vertically oriented element and a lower horizontally oriented element, said vertically oriented element being greater in width than said upper and lower horizontally oriented elements whereby adjacent pairs of said vertically oriented elements in combination with one of said upper and lower horizontally oriented elements define opposed sides and the top or bottom sides, respectively, of each horizontally accessible compartment of said organizer, each said compartment thereby having a greater height than width, each said lower horizontally oriented element being locatable upon the horizontal shelf panel to receive support for and transmit support to the connected ones of said vertically oriented elements; whereby, said organizer compartmentalizes the horizontally accessible unit into a plurality of individually accessible compartments having vertical segregating elements for separating items stored within different ones of said individually accessible compartments.

2. The organizer according to claim 1 wherein said wire mesh comprises a plastic coated wire mesh.

3. The organizer as set forth in claim 1 including:
    (a) a further length of bendable wire mesh material folded into a repetitive pattern of a further upper horizontally oriented element, a further vertically oriented element and a further lower horizontally oriented element, said further vertically oriented element being greater in width than said further upper and lower horizontally oriented elements whereby adjacent pairs of said further vertically oriented elements in combination with one of said further upper and lower horizontally oriented elements define opposed sides and the top and bottom sides, respectively, of each further horizontally accessible compartment of said organizer, each said further compartment thereby having a greater height than width; and
    (b) a spacer panel positionable and supportable upon said upper horizontally oriented elements for supporting said further lower horizontally oriented elements of said further length of bendable wire mesh; whereby, said organizer includes two tiers of horizontally accessible compartments developed by said continuous length and said further continuous length of bendable wire mesh which lengths of bendable wire mesh receive longitudinal and lateral support from the horizontal shelf panel and the first and second vertical shelf panels of the unit.

4. The organizer according to claim 3 wherein said wire mesh comprises a plastic coated wire mesh.

* * * * *